United States Patent
Farinacci et al.

(10) Patent No.: US 9,632,922 B2
(45) Date of Patent: Apr. 25, 2017

(54) WORKLOAD MAPPER FOR POTENTIAL PROBLEM AREAS USING MODULES AND DEFECT DATA

(71) Applicant: INTERNATIONAL BUSINESS MACHINES CORPORATION, Armonk, NY (US)

(72) Inventors: Jesse L. Farinacci, Buffalo, NY (US); Marc A. Martin, Secaucus, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 14/193,078

(22) Filed: Feb. 28, 2014

(65) Prior Publication Data
US 2015/0248344 A1    Sep. 3, 2015

(51) Int. Cl.
*G06F 11/36* (2006.01)
*G06F 11/00* (2006.01)

(52) U.S. Cl.
CPC ........ *G06F 11/3692* (2013.01); *G06F 11/004* (2013.01); *G06F 11/008* (2013.01)

(58) Field of Classification Search
CPC ............... G06F 19/3431; G06F 19/345; G06F 21/6218; G06F 21/60
See application file for complete search history.

(56) References Cited

U.S. PATENT DOCUMENTS

| | | | |
|---|---|---|---|
| 6,871,326 B1 | 3/2005 | Kazemi | |
| 7,698,275 B2 | 4/2010 | O'Brien et al. | |
| 8,302,088 B2 | 10/2012 | Matthiesen | |
| 2011/0288692 A1* | 11/2011 | Scott | 700/297 |
| 2012/0011083 A1 | 1/2012 | Storms et al. | |
| 2012/0316836 A1* | 12/2012 | Castelli et al. | 702/183 |
| 2014/0136901 A1* | 5/2014 | Butler | G06F 11/3051 714/38.1 |

FOREIGN PATENT DOCUMENTS

| | | |
|---|---|---|
| CA | 2681013 A1 | 9/2008 |
| WO | 2011049667 A1 | 4/2011 |

* cited by examiner

*Primary Examiner* — Jigar Patel
(74) *Attorney, Agent, or Firm* — Cantor Colburn LLP; William A. Kinnaman, Jr.

(57) ABSTRACT

Embodiments are directed to devices, systems and methods for improving the efficiency at which problem areas are identified and prioritized for an existing large, multi-module software system. In some embodiments, a workload mapper generates workload maps that identify the intersection between defect risk scores accumulated for various modules and a log of the modules that are accesses by a given workload. A graphical user interface (GUI) provides the ability to sort, search, compare and display the workload maps against various sort, search and/or compare criteria.

8 Claims, 6 Drawing Sheets

102a z/OS SVT Workload Sampler

Search Criteria

Keywords: CEE

Page Size: 15

Reset  Search

Welcome back, ibmuser@us.ibm
About - Load Modules - Workloads - HIS Walkthrough - Bug/Idea? - Sign Out

| △ Name | Description | Risk Score |
|---|---|---|
| @@CEEST | LE Check if input address is CEESTRAT | 0 |
| @@CEEST#C | LE Check if input address is CEESTRAT | 0 |
| ASBSCEE | | 0 |
| CEE1DA2D | LE Vector Arctanget 2 - double precision - degree | 0 |
| CEE1DACD | LE Vector Arccosine - double precison - degree | 0 |
| CEE1DACS | LE Vector Arccosine - double precision | 0 |
| CEE1DASD | LE Vector Arcsine - double precision - degree | 0 |
| CEE1DASN | LE Vector Arcsine - double precision | 0 |
| CEE1DAT2 | LE Vector Arctangent 2 - double precision | 0 |
| CEE1DATD | LE Vector Arctangent - double precision - degree | 0 |
| CEE1DATN | LE Vector Arctangent - double precision | 0 |
| CEE1DCOS | LE Vector Cosine - double precision | 0 |
| CEE1DCSD | LE Vector Cosine - double precision - degree | 0 |
| CEE1DCSH | LE Vector Hyp. Cosine - double precision | 0 |
| CEE1DCTN | LE Vector Cotangent - double precision | 0 |

| Name | Description | Risk Score |
|---|---|---|

1 - 15 of 980   △ ▽

FIG. 4 z/OS SVT Workload Sampler :: Load Modules :: : CEE1DAT2   Welcome back, ibmuser@us.ibm
About - Load Modules - Workloads - HIS Walkthrough - Bug/Idea? - Sign Out Name : CEE1DAT2

Description : LE Vector Arctangent 2 - double precision

Risk Score : 0

Workloads :

| △ Name | Description | Created | Username |
|---|---|---|---|
| WKLD3 | WKLD3 run in IST with limited real storage | 2014-02-03 - 16:48:12 | ibmuser@us.ibm.com |
| WKLD4 | WKLD4 run in IST with limited real storage | 2014-02-03 - 16:48:12 | ibmuser@us.ibm.com |
| Name | Description | Created | Username |

102c z/OS SVT Workload Sampler :: Workloads :: WKLD3

About - Load Modules - Workloads - HIS Walkthrough - Bug/Idea? - Sign Out

Welcome back, ibmuser@us.ibm

Name: WKLD3
Description: WKLD3 run in IST with limited real storage
Created: Mon Feb 03 16:48:12 GMT-500 2014
Username: ibmuser@us.ibm.com
Total Load Modules: 0
Load Modules:

| △ Name | Description | Risk Score |
|---|---|---|
| CEE1DACD | LE Vector Arccosine - double precision - degree | 0 |
| CEE1DACS | LE Vector Arccosine - double precision | 0 |
| CEE1DASD | LE Vector Arcsine - double precision - degree | 0 |
| CEE1DASN | LE Vector Arcsine - double precision | 0 |
| CEE1DAT2 | LE Vector Arctangent 2 - double precision | 0 |
| CEE1DATD | LE Vector Arctangent - double precision - degree | 0 |
| CEE1DATN | LE Vector Arctangent - double precision | 0 |
| CEE1DCOS | LE Vector Cosine - double precision | 0 |
| CEE1DCSD | LE Vector Cosine - double precison - degree | 0 |

FIG. 6

WORKLOAD MAPPER FOR POTENTIAL PROBLEM AREAS USING MODULES AND DEFECT DATA

BACKGROUND

The present disclosure relates generally to identifying problem areas of a software system, and more specifically to improving the efficiency of systems used to identify and prioritize potential and actual problem areas of large, multi-module software systems.

Mainframe computers process large amounts of data, such as census information, industry/consumer statistics and financial transactions. In addition to processing speed, effective mainframe computers provide internal design redundancy, extensive throughput capabilities and backward compatibility with older software. z/OS® is a 64-bit operating system for mainframe computers manufactured and sold by International Business Machines® (IBM®). z/OS offers the attributes of modern operating systems, along with backward compatibility to functionality that originated in the 1960s and subsequent decades.

Under the high demands of current computing environments, mainframe users are implementing increasingly more sophisticated configurations and systems. Mainframe users often tailor their operating system for a variety of performance benefits and space enhancements, which can unintentionally increase the number and frequency of potential software code problem areas. Also, operating systems that have several decades in the marketplace, and that prioritize backward compatibility, become increasingly large and complex with each new version of the system. For example, z/OS after several decades in the marketplace now includes several tens of thousands of computer libraries/modules of code, and each new z/OS release adds additional libraries/modules that further increase the number and frequency of potential software code problem areas.

Vendors routinely test software to identify problem areas. For example, IBM uses so-called "test case" programs to test z/OS. Test cases are small programs that are run on the operating system to verify quality. As previously noted, as a software system grows in size and complexity, the number of test cases associated with that software system grows as well.

Problem areas are also identified during usage. If an end user encounters a known problem area, the vendor's product support function can direct the user through steps to correct the problem area, such as applying a new software patch. If an end user encounters a new, unidentified problem area, the issue is typically catalogued and verified, then a solution (e.g., a software patch) is generated and implemented as need.

Thus, identifying and prioritizing problem areas can be a challenge for large software systems having unique user configurations, several tens of thousands of modules, several tens of thousands of test cases, backward compatibility and many decades in the marketplace. Such systems can require a significant investment of time and resources to run every applicable test case for every new release of the system. Accordingly, there is a need for devices, systems and methods to improve the efficiency of systems that identify and prioritize potential and actual problem areas of large, multi-module, multi-test case software systems.

BRIEF SUMMARY

Embodiments are directed to a method of identifying potential problem areas of a system comprising a plurality of workloads and a plurality of modules, the method comprising: executing at least one of the plurality of workloads; capturing a log of execution modules that are accessed during said executing; developing a risk score database comprising risk scores for at least some of the plurality of modules; and generating workload maps comprising intersections between said log of execution modules and said risk scores for at least some of the plurality of modules; wherein the potential problem areas comprise said intersections.

Embodiments are directed to a computer system for identifying potential problem areas of a software system comprising a plurality of workloads and a plurality of modules, the computer system comprising: a processor, a memory, a user interface and a display; and the computer system configured to perform a method comprising: executing at least one of the plurality of workloads; capturing a log of execution modules that are accessed during said executing; developing a risk score database comprising risk scores for at least some of the plurality of modules; and generating workload maps comprising intersections between said log of execution modules and said risk scores for at least some of the plurality of modules; wherein the potential problem areas comprise said intersections.

Embodiments are directed to a computer program product for identifying potential problem areas of a software system comprising a plurality of workloads and a plurality of modules, the computer program product comprising a computer usable medium having a computer readable program, wherein the computer readable program, when executed on a computer, causes the computer to perform a method comprising: executing at least one of the plurality of workloads; capturing a log of execution modules that are accessed during said executing; developing, by a processor, a risk score database comprising risk scores for at least some of the plurality of modules; and generating, by said processor, workload maps comprising intersections between said log of execution modules and said risk scores for at least some of the plurality of modules; wherein the potential problem areas comprise said intersections.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

FIG. 4 illustrates a display configuration for a graphical user interface (GUI) embodying the present disclosure;

FIG. 5 illustrates another display configuration for a GUI embodying the present disclosure; and FIG. 6 illustrates another display configuration for a GUI embodying the present disclosure.

Figure 1:
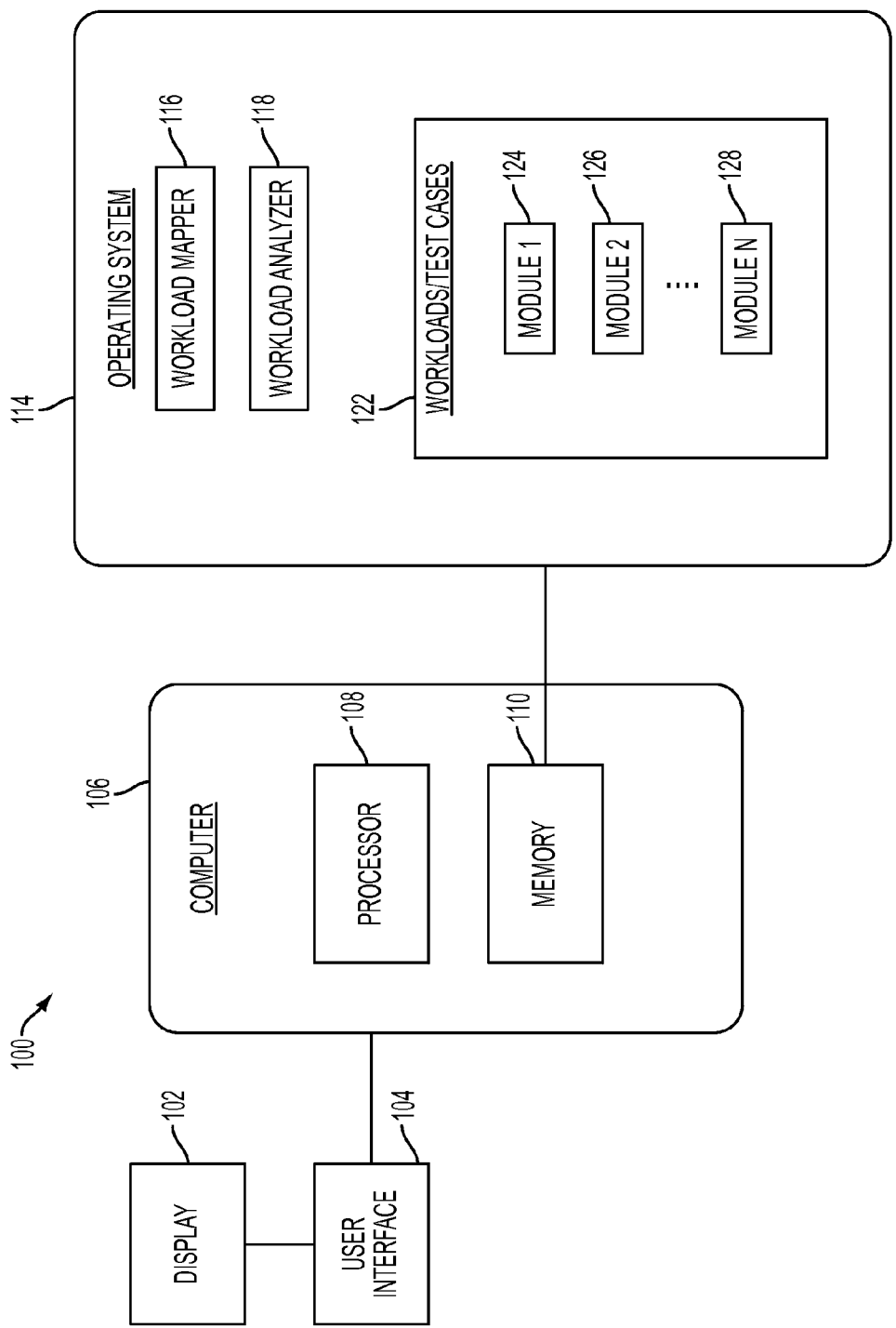
FIG. 1 is a block diagram of a computer system embodying the present disclosure.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

As will be appreciated by one skilled in the relevant arts, the present disclosure may be embodied as a method, system, or computer program product. Accordingly, embodiments of the present disclosure may be implemented entirely in hardware, entirely in software (including firmware, resident software, micro-code, etc.) or in an embodiment combining software and hardware. The various embodiments may all generally be referred to herein as a "circuit," "module," or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable medium may be any medium that can contain, store, communicate, propagate, or transport the program for use by or in connection with the instruction execution system, apparatus, or device.

Many of the functional units described in this specification have been labeled as modules. The present disclosure applies to a wide variety of module implementations. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Computer program code for carrying out operations of the present disclosure may be written in an object oriented programming language such as Java™, Smalltalk, C++ or the like (Java and all Java-based trademarks and logos are trademarks of Sun Microsystems, Inc. in the United States, other countries, or both). However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the present disclosure are described below with reference to flowchart illustrations and/or block diagrams of methods, apparatus (systems) and computer program products according to embodiments of the present disclosure. It is noted that various connections are set forth between elements in the present disclosure and in the drawings. These connections, unless specified otherwise, may be direct or indirect, and the present disclosure is not intended to be limiting in this respect. Accordingly, a coupling of entities may refer to either a direct or an indirect connection. Further, it will be understood that each block of the flowchart illustrations and/or block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer program instructions may also be stored in a computer-readable memory that can direct a computer or other programmable data processing apparatus to function in a particular manner, such that the instructions stored in the computer-readable memory produce an article of manufacture including instruction means that implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic block diagram of a system 100 embodying the present disclosure. System 100 includes a computer 106, a processor 108, a memory 110, a user interface (UI) 104 and a display 102, configured and arranged as shown. Memory 110 includes an operating system 114, which, in one embodiment, is a z/OS operating system. Under the present disclosure, operating system 114 includes a workload mapper 116, a workload analyzer 118, a plurality of workloads/test cases 122, and a plurality of modules 124, 126, 128, configured and arranged as shown.

Figure 2:
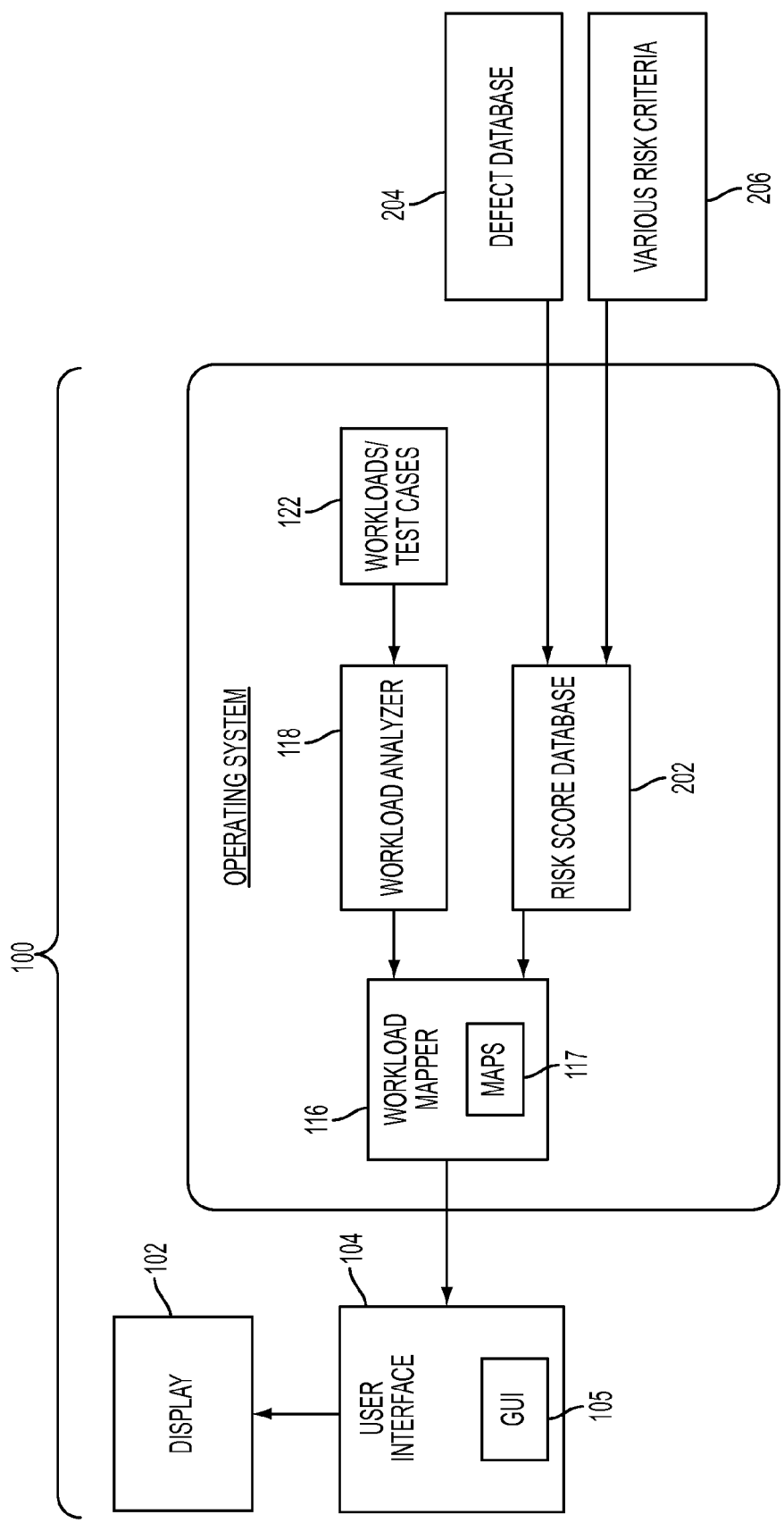
FIG. 2 is a block diagram illustrating additional details of a computer system embodying the present disclosure.

FIG. 2 illustrates additional details of system 100, along with additional details of certain functional relationships. It should again be emphasized here that the functional relationships shown in FIG. 2 do not imply a particular sequence of events or flow of information/signals. For instance, the actions may be performed in a differing order or actions may be added, deleted or modified. Also, the term "coupled" describes having a signal path between two elements and does not imply a direct connection between the elements with no intervening elements/connections therebetween. All of these variations are considered a part of the present disclosure. As shown in FIG. 2, workloads/test cases 122 are coupled to workload analyzer 118, which is coupled to workload mapper 116. A defect database 204 and a set of risk criteria 206 are coupled to a risk score database 202, which is coupled to workload mapper 116. Workload mapper 116 is coupled to a graphical user interface (GUI) section 105 of UI 104, which is in turn coupled to display 102. Additional details of FIG. 2 are described later in this disclosure.

Computer 106 of FIG. 1 is typically a mainframe computer, but may also be a personal computer, laptop computer, workstation, etc. with a mainframe operating system or a mainframe operating system emulator. Processor 108 may be a single processor, multiple processors, a chipset with a processor, or any other configuration of electronic parts and components comprising a processor that may process lines of computer code. Memory 110 may be random access memory ("RAM"), a hard disk drive, tape storage, an optical drive, flash memory, or other memory capable of storing data. Memory 110 may be connected to computer 106 over a computer network such as a LAN, WAN, SAN, etc. Memory 110 may also be connected to computer 106 over a communication bus such as a Small Computer Systems Interface ("SCSI"), Advanced Technology Attachment ("ATA"), or other appropriate communication bus.

UI 104 may be a terminal, a personal computer, a laptop computer, a tablet computer, a personal digital assistant ("PDA") or similar computing device capable of providing a way for a user to input data to computer 106. In one embodiment, UI 104 includes a keyboard connected to computer 106. UI 104 may be connected to computer 106 by direct wiring or through a computer network such as the Internet, a local area network ("LAN"), a wide area network ("WAN"), a wireless network, a storage area network ("SAN"), or any other connection capable of transmitting data from UI 104 to computer 106.

Display 102 may be a computer monitor, a liquid crystal display ("LCD") monitor, or any device capable of displaying data on a screen, paper, or other media. In one embodiment, display 102 displays GUI 105 that facilitates the display of data to a user. Examples of displays 102a, 102b showing a suitable GUI format are shown in FIGS. 4 and 5 and described in more detail later in this disclosure.

Turning now to a description of the disclosed embodiments, and with reference to the configurations shown in FIGS. 1 and 2, the present disclosure relates in general to large and complex operating systems. Although the present disclosure is described in connection with a z/OS operating system, the disclosure is broad enough to cover any large and complex software system with multiple modules and multiple associated test cases. Defect database 204 shown in FIG. 2 is a database maintained in the course of operating system 100. In a conventional configuration, defect database 204 is a database of all historical problem areas where a fix was provided. Often, the defects that populate defect database 204 result from defects identified by customers using operating system 114 in the marketplace. Using the IBM z/OS software code as an example, when a new, unidentified potential problem is identified, a problem management record (PMR) is opened on a case-by-case basis by IBM support. Every PMR receives a unique identification number, and all communication and support activities are handled under this number. IBM specialists attempt to isolate the identified error and detect the failing database software component (e.g., a module). When the problem is reproducible and isolated, an authorized program analysis report (APAR) is opened. Thus, an APAR is a named issue within an IBM program, and is opened after a customer or IBM support personnel discover a problem with the database software code. Every APAR has a unique identification number. After the IBM development team solves the problem defined in the APAR, the database software fixes will be provided to customers. High impact pervasive (HIPER) APARs are critical problem areas of which all customers should be aware.

Additional information about the defects identified in defect database 204 is provide by various risk criteria 206, including but not limited to the modules or other operating system artifacts that were updated to address the problem areas; the severity of the defect; what user reported the defect (may be more than one); was the fix classified as one for immediate application; was the defect a fix to another defect; prioritize recent defects over older defects; and other optional weighting mechanisms. Both defect database 204 and various risk criteria 206 feed information into risk score database 202, which uses the information to determine as risk score for the various modules that were identified in defect database 204.

Workloads/test cases 122 generally comprise a variety of modules (122, 124, 126 shown in FIG. 1). As previously described, test cases are small programs that are run on a computer system (e.g., an operating system) to verify quality. As a software system grows in size and complexity, the number of workloads, test cases and load modules associated with that software system grows as well. Workload analyzer 118 implement a basic scrubbing technique that analyzes workloads/test cases and logs the load modules and/or other code paths that are accessed in executing the workloads/test cases. Workload analyzer 118 provides the logs of the modules or code paths that are accessed in executing the workloads/test cases to workload mapper 116, which maps the logs against the risk scores developed through risk score database 202. Maps 117 developed by workload mapper 116 are provided to UI 104 and GUI 105, which includes the ability to search, sort and/or compare maps 117 against a variety of search, sort and/or comparison criteria. Display 102 displays the results generated by GUI 105.

Figure 3:
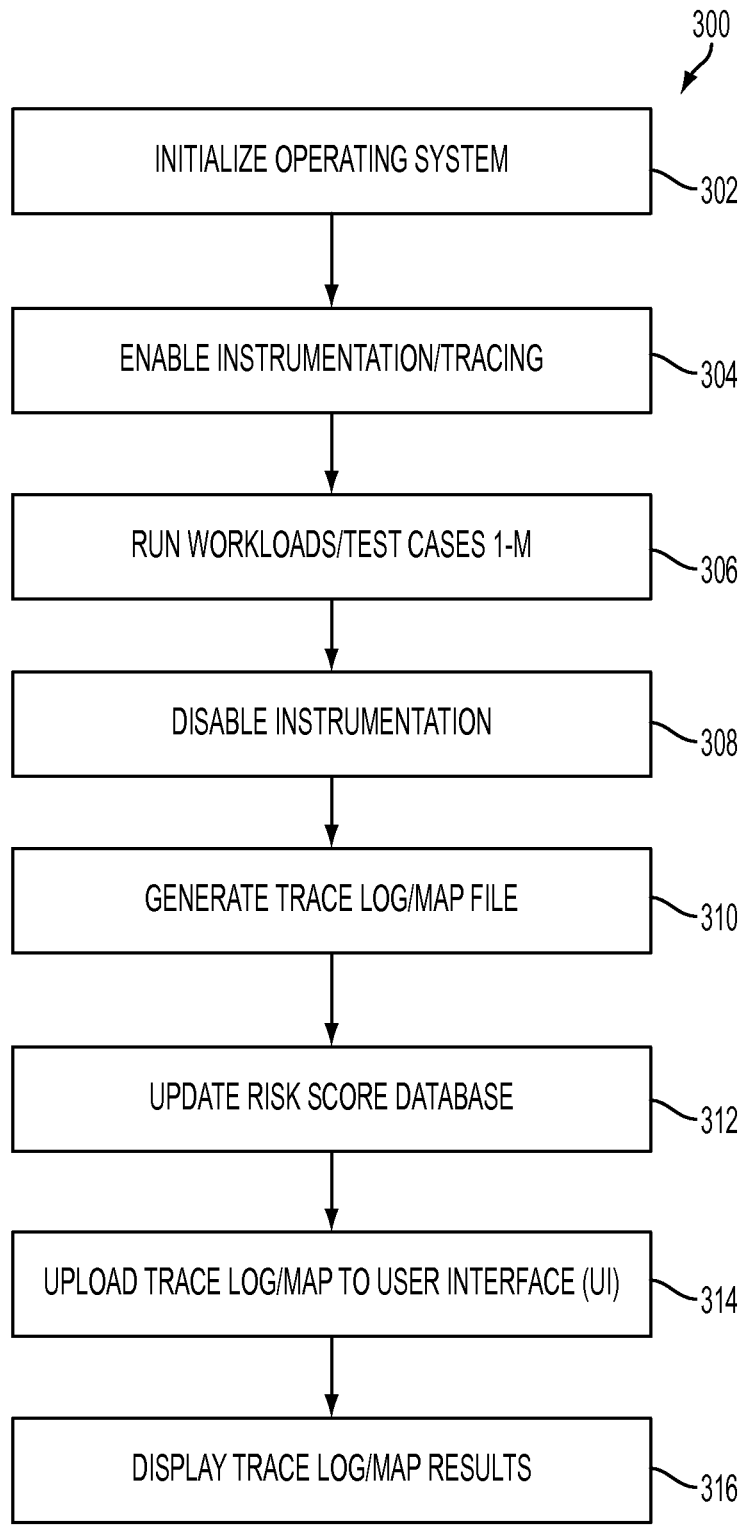
FIG. 3 is a flow diagram illustrating a methodology embodying the present disclosure.

FIG. 3 illustrates a methodology 300 embodying the present disclosure. It should be emphasized here that the functional relationships shown in FIG. 3 do not imply a particular sequence of events or flow of information/signals. For instance, the actions may be performed in a differing order or actions may be added, deleted or modified. Also, the term "coupled" describes having a signal path between two elements and does not imply a direct connection between the elements with no intervening elements/connections therebetween. All of these variations are considered a part of this disclosure. Methodology 300 may be implemented by processor 108 (shown in FIG. 1) to generate maps 117 (shown in FIG. 2). As shown, methodology 300 begins with a block 302 in which the operating system is initialized. Methodology 300 then moves to a block 304 to enable instrumentation/tracing, which is performed by workload analyzer 118 (shown in FIG. 1). Block 306 then runs workloads and/or test cases 1-M through workload analyzer 118, and block 308 disables the instrumentation/tracing. Block 310 generates a trace log/map file, again via workload analyzer 118. Block 312 updates risk score database 202 (shown in FIG. 2), and block 314 uploads trace log/map to UI 104 and GUI 105. Block 316 displays the trace log/map results.

Using the IBM z/OS system as an example, FIGS. 4, 5 and 6 are displays 102a, 102b, 102c showing how maps 117 (shown in FIG. 1) may be searched, sorted and/or displayed. FIGS. 4, 5 and 6 are example configurations, and a wide range of configurations are possible under the present disclosure. The search, sort and/or compare functionality of UI 104 and GUI 105 provide an easily navigated way to dissect trace log/map results. FIG. 4 shows a table of workloads/test cases and their related risk score based on the modules that the workload/test case uses. FIGS. 5 and 6 show the results of a search, sort and compare function for various workloads/test cases of interest. Thus, for all workloads/test cases, as well as component load modules that have been identified by workload mapper 116 (shown in FIGS. 1 and 2), displays 102a, 102b, 102c may provide a variety of general workload/test case meta data, including but not limited to: the individual who submitted the workload/test case; when the workload/test case was submitted; a small description of the workload/test case provided by the user; a list of all load modules that were touched/executed during the workload/test case execution; and a computed risk score of all load modules. Additionally, for all load modules, including the detailed analysis for each load module, displays 102a, 102b, 102c may include: the name and description; a computed risk score for the load module; and a list of all workloads that have touched/executed the load module.

Thus, for system 100 having a large number of modules 124, 126, 128 and a large number of workloads/test cases 122, a vendor responsible for identifying and prioritizing software code problem areas is capable of efficiently answering a variety of important questions, including but not limited to: which load modules are executed by a workload/test case; which workloads/test cases will execute a particular load module or code path; under time constraints, which workloads/test cases should be run first in order to validate quality for a specific load module(s); which load modules are high risk for customers (risk score); which load modules are high risk for customers and have no automated workloads that can be run to validate the load module; and, under time constraints, where should new test case creation resources be focused (e.g., a load modules may have a high risk score but no associated workloads).

Various embodiments of the present disclosure have been described with reference to the related drawings. Alternate embodiments may be devised without departing from the scope of this disclosure. It is noted that various connections are set forth between elements in the present disclosure and in the drawings. These connections, unless specified otherwise, may be direct or indirect, and the present disclosure is not intended to be limiting in this respect. Accordingly, a coupling of entities may refer to either a direct or an indirect connection.

In some embodiments, various functions or acts may take place at a given location and/or in connection with the operation of one or more apparatuses or systems. In some embodiments, a portion of a given function or act may be performed at a first device or location, and the remainder of the function or act may be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There may be many variations to the diagram or the steps (or operations) described therein without departing from the spirit of the disclosure. For instance, the actions may be performed in a differing order or actions may be added, deleted or modified. Also, the term "coupled" describes having a signal path between two elements and does not imply a direct connection between the elements with no intervening elements/connections therebetween. All of these variations are considered a part of the present disclosure.

What is claimed is:
1. A computer system for analyzing a software system comprising a plurality of workloads and a plurality of software system modules, the computer system comprising:
  a processor communicatively coupled to a memory; and
  the computer system configured to perform a method comprising:
    storing historical defects of ones the plurality of software system modules for which defect fixes have been provided;
    storing risk criteria of the historical defects and the defect fixes;
    executing at least one of a plurality of test cases comprising test case software that, when run on the software system, tests the software system;
    capturing a log of test case execution modules comprising software system modules that are accessed during said executing;
    developing a risk score database comprising risk scores for the plurality of software system modules for which defect fixes have been provided, wherein the risk scores are based at least in part on the risk criteria;

generating workload maps comprising intersections between said log of test case execution modules and said risk scores for at least some of the plurality of software system modules; and based at least in part on said workload maps, generating data that identifies a prioritization of the plurality of test cases.

2. The computer system of claim 1 further comprising:

incorporating said workload maps into a graphical user interface (GUI); and displaying said GUI on a display.

3. The computer system of claim 2 wherein said GUI has an ability to search said workload maps based on at least one search criterion.

4. The computer system of claim 2 wherein GUI has and an ability to sort said workload maps based on at least one sort criterion.

5. The computer system of claim 2 wherein said GUI has an ability to compare said workload maps based on at least one comparison criterion.

6. The computer system of claim 1 wherein said risk criteria comprise at least one of:

at least one weighted risk criterion;

a severity assessment of said historical defects; and a frequency of occurrence of said historical defects.

7. The computer system of claim 1, wherein the computer system comprises an operating system.

8. The computer system of claim 1, wherein the method performed by the computer system further comprises, based at least in part on said workload maps, generating data that can be used as inputs to a decision on the development of new test cases for of the software system.

* * * * *